United States Patent [19]
Kiefer et al.

[11] Patent Number: 5,127,931
[45] Date of Patent: Jul. 7, 1992

[54] PROCESS FOR ION EXCHANGE ON GLASS OR GLASS CERAMIC

[75] Inventors: Werner Kiefer; Erich Rodek, both of Mainz, Fed. Rep. of Germany

[73] Assignee: Schott Glaswerke, Mainz, Fed. Rep. of Germany

[21] Appl. No.: 725,894

[22] Filed: Jul. 1, 1991

Related U.S. Application Data

[63] Continuation of Ser. No. 442,105, Nov. 28, 1989, abandoned.

[30] Foreign Application Priority Data

Nov. 28, 1988 [DE] Fed. Rep. of Germany ....... 3840071

[51] Int. Cl.⁵ ............................................. C03C 21/00
[52] U.S. Cl. ................... 65/30.13; 65/30.14; 250/292
[58] Field of Search ............... 65/30.13, 30.14; 250/292.3

[56] References Cited

U.S. PATENT DOCUMENTS

| | | | |
|---|---|---|---|
| 1,592,429 | 7/1926 | Kraus | 65/30.13 X |
| 2,919,209 | 12/1959 | Bossard | 65/30.13 X |
| 3,420,698 | 1/1969 | Smith | 65/30.13 X |
| 3,468,745 | 9/1969 | Navez et al. | 65/30.13 X |
| 3,524,737 | 8/1970 | Doyle et al. | 65/30.14 |
| 3,607,172 | 9/1971 | Poole | 65/30.14 |
| 3,615,323 | 10/1971 | Cornelissen et al. | 65/30.14 |
| 3,791,809 | 2/1974 | Lau | 65/30.14 |
| 4,397,667 | 8/1983 | Morimoto et al. | 65/30.13 |

FOREIGN PATENT DOCUMENTS

| | | |
|---|---|---|
| 2605883 | 10/1976 | Fed. Rep. of Germany . |
| 2829963 | 3/1979 | Fed. Rep. of Germany . |
| 3001460 | 7/1981 | Fed. Rep. of Germany . |
| 56-17948 | 2/1981 | Japan ................ 65/30.13 |
| 57-56353 | 4/1982 | Japan ................ 65/30.13 |

OTHER PUBLICATIONS

Glastechn, Ber. 50 (1977) Nr. 4, S. 63-67.

Primary Examiner—Robert L. Lindsay
Attorney, Agent, or Firm—Millen, White & Zelano

[57] ABSTRACT

For ion exchange at the surface of glass or glass ceramic, the ion exchange is carried out by means of a solid layer containing mainly one or more salts which do not melt at the exchange temperature and contain mono- or divalent cations. The layer can be applied to the glass as a dispersion in water or as an organic dispersion medium. Preferably, its thickness is 0.02 to 2 mm and the salts have a particle size of less than 60 μm. Despite the solid reaction, the ion exchange proceeds at a surprisingly rapid rate and leads to products having highly reproducible properties. Corrosive attack of the glass surface does not take place.

16 Claims, No Drawings

PROCESS FOR ION EXCHANGE ON GLASS OR GLASS CERAMIC

This application is a continuation of application Ser. No. 442,105, filed Nov. 28, 1989, now abandoned.

BACKGROUND OF THE INVENTION

This invention relates to a process of ion exchange on the surface of glass or glass ceramics.

Ion exchange on glass or glass ceramic based on oxides, in particular based on silicates, by ion exchange of alkali metal ions at the glass surface has found wide industrial application, in particular for chemical hardening.

At temperatures below the transformation temperature Tg, smaller alkali metal ions are replaced by larger ones ("crowding"; "ion stuffing"), which results in compressive stress at the glass surface, thus significantly improving the strength of the glass. The higher the temperature during the ion exchange, the more rapid the ion exchange; however, the temperature selected must not be so high that stress relief can occur in the glass. Conversely, the further the temperature drops below Tg, the longer the time necessary for hardening the surface. A favorable temperature is about 100° C. below Tg (G. H. Frischat, "Ionic Diffusion in Oxide Glasses," Trans Tech Publications, Aedermannsdorf (Switzerland), 1975, p. 75).

In ion exchange above the transformation temperature Tg, it is also possible to produce at the surface glass or even crystals having different (lower) coefficients of expansion, which after cooling lead to a compressive stress at the surface. However, the ion exchange temperature selected must not be so high that the glass can become deformed during the exchange process.

It is furthermore known to produce a coloration in the glass surface by ion exchange, for example, by exchange of alkali metal ions with silver and/or copper ions (see Frischat, p. 83 ff). This method is utilized, for example, when producing scales on glass equipment. The scale is applied to the glass in the form of an AgCl-containing paste; during the ion exchange, silver ions diffuse into the glass and produce therein a substantially permanent coloration. These pastes contain a carrier material which supplies the paste with the necessary cohesion at elevated temperatures (W. Kiefer, Glastechn. Ber., 46 (8), 325 (1973)). Moreover, the carrier material is intended to absorb the exchanged ions. After the coloration step, the paste residues are in some cases very strongly bound to the glass surface which makes their removal difficult, resulting in the risk of damaging the glass surface (microcracks) during the removal.

It is still further known to exchange alkali metal ions in the glass surface for protons, for example, by means of moist sulfur dioxide or trioxide vapors (see, for example, Frischat, p. 88). This exchange improves water resistance and in some cases also the strength.

Many reports on the hardening of glass by means of ion exchange have been published. A summary from a rather theoretical view is the already quoted book by Frischat, in particular the chapter "Chemical diffusion," p. 72-88. One of the industrial processes is represented by German Offenlegungsschrift 1,496,074, in which alkali metal ions are exchanged for lithium ions at a temperature above Tg (600° C.-750° C.). The surface film formed has a lower coefficient of expansion than the remaining glass and, upon cooling, produces the desired compressive stress. According to German Offenlegungsschrift 1,496,470, lithium ions are exchanged in the surface film for larger alkali metal ions at a temperature of about 50° C.-100° C. below Tg, which also results in the desired compression stress. German Auslegeschrift 1,287,763, German Offenlegungsschrift 3,537,561 and U.S. Pat. No. 3,573,072 describe processes for hardening glass ceramic at temperatures below Tg, in which alkali metal ions having a smaller ionic radius are replaced by those having a larger radius. According to German Offenlegungsschrift 1,803,540, $Mg^{++}$ and $Zn^{++}$ ions in a glass ceramic are replaced in each case by 2 $Li^+$ ions. The replacement of sodium ions by potassium ions in the surface of a soda-lime glass, followed by removal of alkali from the glass surface is described in Japanese Offenlegungsschrift 55/104,949 (Aug. 11, 1980).

The ion exchange step is generally carried out by means of a molten salt. At low temperatures, molten alkali metal nitrates and nitrites are used. Nitrate and nitrate/nitrite baths can be used up to temperatures of about 450° C. but above this temperature they begin to decompose and attack the surface not only of the glass to be treated but also of the container and other equipment. Working with nitrate and nitrite melts is not without risk and requires special safety precautions due to toxicity and the risk of explosion, which severely limits large-scale industrial use. At higher temperatures, chloride and/or sulfate melts are usually used. Since the melting points of the pure salts are in general too high, eutectics of several salts having the same cations or of several cations having the same anions are usually used. The use of salt melts consisting of a mixture of chlorides and sulfates has the disadvantage that many glasses are attacked at the surface by the melt, since the chlorides are extremely aggressive in this temperature range. The use of salt melts containing two and more cations has the disadvantage that the cations severely obstruct one another. Thus, for example, the exchange of potassium is severely restricted by the presence of sodium ions. What is more, the salt baths undergo aging due to the absorbed ion exchange products absorbed concentrating in the salt bath, which obstructs or weakens the ion exchange. Therefore, the salt baths must be regularly renewed. The disposal of the used salt baths also requires complicated procedures. A further aging-caused disadvantage of the salt baths is that the exchange conditions alter with time. The exchange times and temperatures have to be constantly adapted to these changes, to obtain a product which has consistent properties.

SUMMARY OF THE INVENTION

An object of the invention is to provide a process for ion exchange in the surface of glass or glass ceramic which eliminates the inherent disadvantages of the salt melt.

Furthermore, another object is to provide a process wherein consistent conditions are always present during the ion exchange, that is, that in each exchange process a fresh ion source is available.

A still further object is to provide a process wherein, irrespective of the exchange medium used for the ion exchange, attack or damage of the glass surface or of associated equipment should not take place and the exchange medium should be easily removable from the glass surface.

Upon further study of the specification and appended claims, further objects and advantages of this invention will become apparent to those skilled in the art.

To attain the objects of the invention, the ion exchange takes place as a solid reaction. First, the glass or glass ceramic is coated with a film which is solid at the ion exchange temperature and substantially comprises one or more salts containing exchangeable cations which do not melt at the exchange temperature. A film which is solid at the exchange temperature is understood to mean that the salt or the salt mixture has not melted at the exchange temperature and is present in solid form. In general, it is preferred to use only a single salt, unless it is intended to effect a simultaneous exchange of two or more metal ions, which in the case of the solid reaction is easier to achieve than in a melt, which, as is known, represents a homogeneous solution. The salts which can be used comprise any salts which are solid and do not melt at the exchange temperature and contain exchangeable cations, in particular salts containing mono- or divalent cations. Salts of the elements from main and subgroups 1 and 2 of the Periodic Table are preferred. Salts of the alkali metals, of silver, zinc and cadmium are particularly preferred. However, it is also possible to use salts which contain different divalent cations, for example, $Fe^{++}$, $Ni^{++}$, $Co^{++}$, $Mn^{++}$ and the like.

The salts are preferably sulfates, chlorides, pyrosulfates, carbonates, nitrates, phosphates, nitrites and oxides. For reasons of cost and for reasons of easy availability, sulfates and chlorides are especially preferred. It should also be noted that in contrast to the exchange processes in a salt bath, the use of chlorides in solid form does not lead to any damage of the glass surface. The salts should not decompose at the exchange temperature, because the decomposition products frequently attack the glass surface and because their gaseous components can lead to air pollution and corrosion problems in the plants. Furthermore, an irregular ion exchange may occur due to the decomposition, and the removal of the decomposition products can give rise to problems.

In order to achieve uniform ion exchange, it is necessary that the area covered be substantially homogeneous and transverse diffusion along the surface be substantially suppressed. This requires a small particle size of the salt. Although particles sizes of the salt of 250 $\mu$m can lead to very good results, particle sizes of less than 60 $\mu$m, in particular of less than 20 $\mu$m, are preferred, since with these particle sizes the thickness of the film to be applied to the glass surface can be kept lower, since a fine-particle film is easier to apply and since the diffusion process proceeds more rapidly.

It is known that in practice, cracks up to a depth of about 30 $\mu$m are produced. For these reasons, a film thickness of the ion-exchanged layer of 50–100 $\mu$m must be achieved in the hardening. These film thicknesses are achieved if the thickness of the applied salt film is 0.02–2.0 mm, in particular 0.4–1.6 mm. A change in the ion exchange rate due to the exchange components is in many cases not observed.

However, it also happens that with increasing concentration of the ions diffusing out of the glass (ion exchange products) in the exchange medium, the exchange is hindered or weakened. This effect can be utilized to particular advantage. Depending on the thickness of the applied layer, a certain concentration of ion exchange products in the applied film is reached sooner or later, as a result of which the ion exchange is slowed down accordingly. By varying the layer thickness, it is thus possible to decide after which amount of ions exchanged slowing down will occur. If the duration of the treatment is chosen such that its end is already in the region in which a certain equilibrium between metal ions to be exchanged and metal ions exchanged in the film has already been established and an appreciable decrease in the exchange rate has taken place, relatively small variations in the temperature or treatment have only a small effect on the result of the ion exchange. Thus, it is relatively simple to obtain process products which have very uniform and highly reproducible properties.

The salt film can be applied to the glass surface by conventional methods. Suitable methods include, for example, application of finely powdered salt by means of electrostatic forces, spraying of a dispersion or suspension of the salt, dipping of the glass surface into the dispersion or suspension or coating by means of screen printing or transfer printing. In particular, the latter techniques are suitable to coat only selected portions of the glass surface and to arrange different ion exchange media next to one another on the surface, which can be exchanged in a joint exchange process. A suitable coating process for the coating of the inner surface of containers is flow coating by means of a suspension.

A suspension which is suitable for coating can be prepared by methods known per se by stirring or grinding the salts in an aqueous or nonaqueous suspending liquid. Suitable nonaqueous suspending liquids or dispersion media include a large number of organic liquids, of which animal, vegetable, mineral or synthetic oils, benzine, alkylated aromatics, such as toluene, or glycol ether are mentioned just by way of example. The suspension or dispersion in organic liquids have the advantage that they are particularly stable, but the disadvantage that during the drying, organic vapors are liberated which may have to be disposed of, for example, by adsorption on activated carbon or by subsequent combustion. The suspensions or dispersions in water have the advantage that the water vapor liberated during the drying does not affect the environment, but on the other hand, the suspensions or dispersions do not have unlimited shelf life, since as a result of the known thermodynamic laws, grain enlargement of the salts occur.

The suspensions or dispersions can additionally contain small amounts of conventional dispersing agents, for example, wetting agents, polyphosphates, etc., antisettling agents and thickeners, for example, pyrogenic silica (Aerosil ®), methylcellulose and derivatives thereof, etc. By means of the thickeners, it is possible to adjust the viscosity of the dispersions and thus also the layer thickness, the preferred viscosity of the dispersion being at 25° C. about 5–200 (sec) (Ford cup with nozzle No. 4). A viscosity up to about 50 (sec) is particularly useful for spraying or dipping, whereas higher viscosities are better for screen printing. The coating can be obtained in an easy manner by dipping the substrate into the dispersion or spraying the dispersion onto the substrate. If the layer is not thick enough after one application, any desired layer thickness can be achieved by multiple application, each followed by drying. The above-mentioned auxiliary agents are known to one skilled in the art and find wide application in the preparation of dispersions of any type, for example, emulsion paints or printing inks. In general, the concentration of the particulate solid salt in such dispersions is about 25 to 55, preferably 30 to 40, percent by weight.

If the layer is applied in the form of a dispersion or suspension, it is also necessary to dry the layer before the ion exchange. This can be effected by slight heating to temperatures between 50° C. and 400° C. before or even during the heating period of the glass or the glass ceramic to the ion exchange temperature. In any case, the dispersion medium and the temperature of evaporation selected must be such that the layer is not damaged due to an excessive rate of evaporation. In general, one of ordinary skill can determine an acceptable rate for any given system.

Since the layer is usually applied in the form of a paste, it is extremely simple to coat only part of the surface with the exchange material and thereby carry out the ion exchange only in arbitrarily selected locations on the substrate. Thus, patterns in the glass surface or, for example, hardened areas in an otherwise unhardened disc can be produced in a simple manner.

After the application of the salt film, followed, if necessary, by drying, the glass or glass ceramic can be brought to the ion exchange temperature in an oven. Depending on the type of glass or glass ceramic and depending upon whether the process is to be carried out above or below the glass transformation temperature Tg, this temperature is between about 400° C. and about 1,000° C. It is extremely surprising that solid phase ion exchange leads to considerably better results compared with the ion exchange by means of a salt bath at identical treatment times and identical temperatures. In general, the rate of the ion exchange reaction is a function of the temperature of the glass, but such temperature must not reach the melting point of the salt in order to avoid a molten salt phase.

During the ion exchange, the glass or glass ceramic parts can lie flat, stand vertically or be suspended, for example, inside the oven. Depending on the residence time and the production volume, ovens which are operated batch-wise or continuously can be used. The residence time of the parts at the ion exchange temperature can be a few minutes in the case of highly mobile ions such as lithium ions up to several hours in the case of ions having low mobility. Apart from the ionic mobility, the residence time naturally also depends on the temperature and the depth down to which the ion exchange is to be carried out in the glass surface.

After the ion exchange is completed, the applied layer is removed. Since the layer has neither melted nor other substances which adhere to the glass have been formed, the layer can be removed easily and rapidly. The layer can be removed simply by brushing it off or by dissolving it is water. In some cases, it is recommended first to brush off most of it and dissolve the remainder. The dissolution of the layer proceeds more rapidly than in the case of a melted residue, such as is present after an ion exchange in a salt bath, since as a result of the microporosity of the layer the surface accessible to water is much larger.

The advantages obtainable by means of the invention are in particular that the ion exchange can take place at any temperature without damaging the glass surface, that expensive and in some cases dangerous salt baths can be avoided and that an extremely uniform and high product quality can be obtained in an easy and inexpensive manner.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding German application P 38 40 071.5-45, are hereby incorporated by reference.

EXAMPLES

Example 1

A dispersion having an average $K_2SO_4$ particle size of 10 μm was prepared from 90 g of $K_2SO_4$ and a mixture of 60 g of screen printing oil (from Degussa, No. 8-80-392) and 150 g of ethanol as dispersion medium by milling in a ball mill. This dispersion was used for dip coating to coat 20×60 mm large and 4 mm thick polished glass plates made of lithium aluminosilicate glass containing as main components 62.0% by weight of $SiO_2$, 21.0% by weight of $Al_2O_3$, 3.0% by weight of $Li_2O$, 6.0% by weight of ZnO, 1.65% by weight of $TiO_2$, 1.5% by weight of $ZrO_2$ and 1.5% by weight of BaO. The dispersion medium was evaporated by heating the plates to 80° C. for one hour. The dry $K_2SO_4$ layer had a thickness of 0.8 mm. Ion exchange was then carried out by heating the coated plates at 640° C. for 4 hours. After cooling, the $K_2SO_4$ layer was removed by rinsing it off with water. The thickness of the ion-exchanged layer in the surface of the glass plate was 50 μm and the surface compressive stress was 8,000 $nm \times cm^{-1}$, which corresponds to $270 N \times mm^{-2}$. The polished surfaces of the plate did not show any visible changes. (The chemical make-up of the screen printing oil is proprietary; however, an oil similarly useful for the purpose of the present invention consists essentially of about 3% (by weight) mineral wax in a turpentine/-turpineol solution to yield a viscosity at 25° C. of 290±30 mPa.s.)

Example 2

Example 1 was repeated, except that the glass plates were converted before the coating into glass ceramic plates by a temperature treatment (1 hour at 700° C.) to form seed crystals at 1 hour at 900° C. to effect crystallization. As a result of the higher transformation temperature of the glass ceramic, the ion exchange was then carried out at 700° C. instead of 640° C. The thickness of the ion-exchanged layer in the surface of the plate was 50 μm; the compressive prestress in the surface of the plate was 6,000 $nm \times cm^{-1}$, which corresponds to $200 N \times mm^{-2}$. The polished surfaces of the plates showed no visible changes.

Example 3

Example 2 was repeated with the only difference that the ion exchange was not carried out by means of a solid $K_2SO_4$ layer but in a salt bath consisting of 52% by weight of $K_2SO_4$ and 48% by weight of KCl. The thickness of the ion-exchanged layer on the surface of the plate was 30 μm; the surface compressive stress was 2,000 $nm \times cm^{-1}$, which corresponds to $67 N \times mm^{-2}$.

The surface of the plate was slightly damaged (formation of spots).

Example 4

A dispersion having an average Li$_2$SO$_4$ particle size of 15 μm was prepared from 33 g of Li$_2$SO$_4$, 20 g of screen printing oil (from Degussa, No. 8-80-392) and 47 g of ethanol by milling in a ball mill. This dispersion was used to coat glass plates as described in Example 1 by dip-coating. Evaporation of the dispersion medium by heating at 80° C. for 1 hour gave a Li$_2$SO$_4$ layer having a thickness of 0.8 mm. The coated glass plates were converted into glass ceramic plates by a temperature treatment (1 hour at 700° C.) to form seed crystals and 1 hour at 900° C. to effect crystallization. Simultaneous with ceramization, ion exchange took place. An approximately 50 to 10 μm thick crystalline surface layer was formed, below which an approximately 25 μm thick compressive stress zone having a compressive stress of about 3,000 nm×cm$^{-1}$, which corresponds to about 100N×cm$^{-2}$, is present. The exchange of lithium ions in the glass surface causes surface crystallization, which slightly precedes the bulk crystallization. The surface of the ceramized plate showed no visible changes.

Example 5

For guidelines on the use of an electric field for ion exchange, reference is invited to the literature, for example, Glastechnische Berichte 50 (1977), No. 4, pp. 63-67.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process of hardening a glass or glass ceramic surface by providing a compressive stress at said surface, comprising conducting an ion exchange process on glass or glass ceramic salts at about 400°-1,000° C., the improvement which comprises first coating the glass or glass ceramic with a film which is solid at the ion exchange temperature, said film consisting essentially of at least one particulate solid salt having a particle size of less than 250 microns and containing an exchangeable cation, said solid salt being a sulfate or chloride of potassium or lithium; bringing the glass or glass ceramic to an ion exchange temperature below the melting point of said salt; and conducting the ion exchange in the solid phase to obtain a hardened glass or glass ceramic surface without melting or decomposing said salt.

2. A process according to claim 1, wherein the salt in the film has a particle size of less than 60 μm.

3. A process according to claim 1, wherein the salt in the film has a particle size of less than 20 μm.

4. A process according to claim 1, wherein the film has a thickness of 0.02 to 2 mm.

5. A process according to claim 1, wherein the film has a thickness of 0.4 to 1 mm.

6. A process according to claim 1, wherein the solid salt is potassium a sulfate.

7. A process according to claim 1, characterized in that only a part of the glass or glass ceramic is subjected to exchange.

8. A process according to claim 1, wherein the film is applied by spraying, dipping, screen printing or transfer printing.

9. A process according to claim 1, wherein the ion exchange is supported by an electric field.

10. A process according to claim 1, wherein said coating comprises applying to the glass a dispersion containing about 25-55% by weight of said salt and having a viscosity of about 5-200 (sec) at 25° C., and evaporating residual dispersant from the dispersion.

11. A process according to claim 1, wherein the process is to harden glass, and the exchangeable cation is larger than at least one cation in the glass.

12. A process according to claim 1, wherein the exchangeable cation is potassium.

13. A process according to claim 11, wherein said hardened layer is an ion-exchanged layer of 50-100 microns.

14. A process according to claim 1, wherein the process is to harden glass ceramic, and the exchangeable cation is lithium.

15. A process according to claim 1, wherein said ion exchange is conducted while the glass or glass ceramic is in an oven.

16. A process according to claim 6, wherein said ion exchange is conducted while the glass or glass ceramic is in an oven.

* * * * *